United States Patent [19]

Ushio et al.

[11] 4,218,696
[45] Aug. 19, 1980

[54] VIDEO SIGNAL COMPENSATION SYSTEM

[75] Inventors: Fusao Ushio, Hirakata; Noboru Okuno, Sennan, both of Japan

[73] Assignee: Matsushita Electric Industrial Co., Ltd., Osaka, Japan

[21] Appl. No.: 886,114

[22] Filed: Mar. 13, 1978

[30] Foreign Application Priority Data

Mar. 16, 1977 [JP] Japan .................... 52-29435

[51] Int. Cl.² .................... H04N 5/76; H04N 9/535
[52] U.S. Cl. .................... 358/8; 358/31
[58] Field of Search .................... 358/4, 8, 31, 127

[56] References Cited

U.S. PATENT DOCUMENTS

| | | | |
|---|---|---|---|
| 3,872,497 | 3/1975 | Amery et al. | 358/31 X |
| 3,969,757 | 7/1976 | Amery | 358/31 X |
| 3,969,759 | 7/1976 | Amery | 358/127 X |
| 3,996,610 | 12/1976 | Kawamoto | 358/31 |
| 4,021,852 | 5/1977 | Hurst et al. | 358/8 X |
| 4,038,686 | 7/1977 | Baker | 358/8 X |
| 4,057,826 | 11/1977 | Baker | 358/8 X |

Primary Examiner—James W. Moffitt
Assistant Examiner—Aristotelis M. Psitos
Attorney, Agent, or Firm—Stevens, Davis, Miller & Mosher

[57] ABSTRACT

A video signal compensation system wherein a brightness signal and a chrominance signal are separated from each other by a comb filter and a color video signal of a buried subcarrier system in which the brightness signal and the chrominance signal are combined in a frequency interleaved relation, and signal defect portions for the brightness signal and the chrominance signal are substituted by a signal having a frequency equal to an integer multiple of a frequency corresponding to one horizontal scanning period. An output of a one-horizontal scanning period delay line which constitutes the comb filter for extracting the chrominance signal is applied to an input of the comb filter only during the signal defect period with a phase of the chrominance signal being reversed, to separate the chrominance signal and compensate for the signal defect portion of the chrominance signal.

5 Claims, 11 Drawing Figures

VIDEO SIGNAL COMPENSATION SYSTEM

The present invention relates to a compensation system for a defect in a reproduced video signal in a reproducing system for a composite video signal in which a brightness signal and a chrominance signal are combined in a frequency interleaved relationship within a common band, and more particularly to a compensation system for a defect of a video signal from a comb filter in an apparatus for separating a brightness signal and a chrominance signal from each other.

In the accompanying drawings;

FIGS. 1A, 1B, and 1C show frequency spectra for explaining a buried subcarrier system;

Figure 1A:
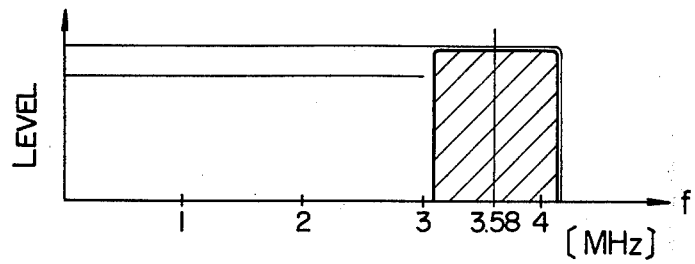
Figure 1B:
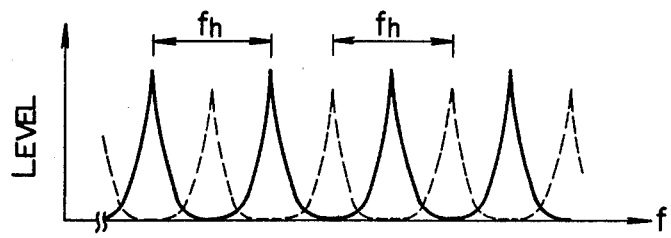

It has been known to combine a chrominance signal with a brightness signal in a frequency interleaved relationship in order to transmit both signals in a common band. For example, when a horizontal scanning frequency $f_h$ and a subcarrier frequency $f_s$ of the chrominance signal are selected to be in a relationship that;

$$f_s = (f_h/2)(2n+1)$$

where n is an integer, the chrominance signal is inserted between the brightness signal components which are frequency distributed at an interval of the horizontal scanning frequency, and no interference occurs between those signals when those signals are combined together. In view of the above, in an NTSC color television system, the horizontal scanning frequency is selected to 15734.264 Hz and the chrominance subcarrier frequency is selected to 455 times one half of the horizontal scanning frequency, that is, 3.579545 MHz (hereinafter simply referred to as 3.58 MHz), and the chrominance signal and the brightness signal are combined together in a band of approximately 4.1 MHz for transmission. A frequency distribution therefor is shown in FIG. 1A, in which the hatched area shows a common area to the chrominance signal and the brightness signal. FIG. 1B shows a further detail of that area, in which a solid line shows the brightness signal and a broken line shows the chrominance signal. The brightness signal and the chrominance signal are distributed alternately at an interval of $f_h/2$ and they do not interfere with each other.

Figure 1C:
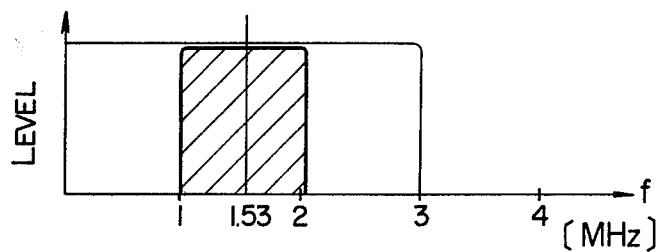

When the video signal is recorded and then reproduced, it has been known to reduce the frequency of the chrominance subcarrier while leaving the horizontal scanning frequency unchanged as shown in FIG. 1C in order to save the band. This system is called a buried subcarrier system to distinguish it from the system of FIG. 1A.

In this system, the frequency of the chrominance subcarrier may be selected to 195 times one half of the horizontal scanning frequency, that is, 1.534090 MHz (hereinafter simply referred to as 1.53 MHz).

In this case, the band of the brightness signal can be reduced to 3 MHz, within which the chrominance signal can be included. Accordingly the band required for recording and reproducing can be saved. However, since an area common to the chrominance signal and the brightness signal lies intermediate of the band of the brightness signal, if the brightness signal which includes the chrominance signal is directly used to display an image in a television receiver, the disturbance to the brightness signal by the chrominance subcarrier remarkably appears in the form of dot which is a very large impediment to clear viewing by a viewer. Further, if the chrominance signal is simply extracted by a band-pass filter to frequency-convert it to a signal of 1.53 MHz–3.58 MHz, a cross-color disturbance by the chrominance signal appeares, which considerably degrades the quality of the chrominance signal.

Figure 2A:
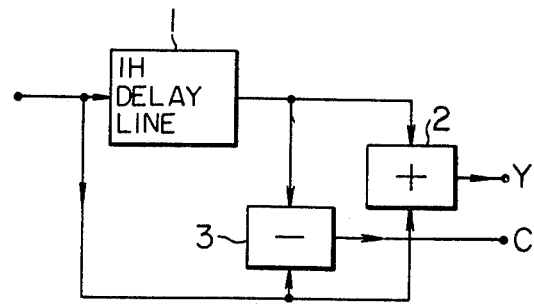
FIG. 2A shows a block diagram of a comb filter.
Figure 2B:
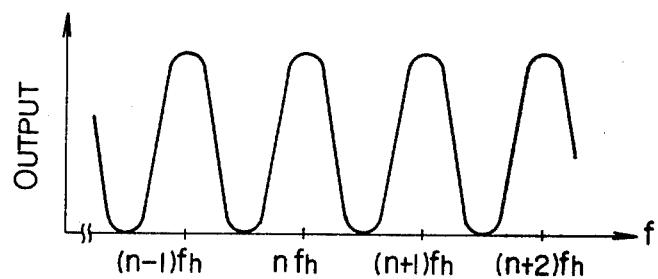
FIGS. 2B and 2C show frequency spectra for explaining the operation of the comb filter of FIG. 2A.
Figure 2C:
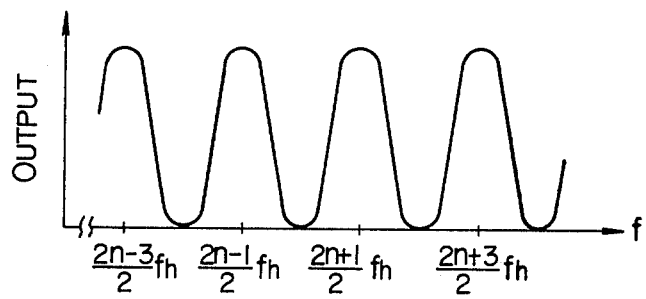

In order to avoid such disturbance, a comb filter has been commonly used. Such a comb filter is shown in FIG. 2A, in which numeral 1 denotes a one-horizontal scanning period delay line (hereinafter referred to as 1H delay line) which functions to delay an input signal thereto by a time period corresponding to a 1H period. Numeral 2 denotes an adding circuit which adds the input signal to the 1H delay line 1 and a signal which has been delayed by 1H period at the same level, and numeral 3 denotes a subtracting circuit which subtracts the signal delayed by 1H period from the input signal to the 1H delay line 1 at the same level. Frequency characteristics of the outputs of the adding circuit 2 and the subtracting circuit 3 are shown in FIGS. 2B and 2C, respectively. The adding circuit 2 and the subtracting circuit 3 are called a Y-type comb filter and a C-type comb filter, respectively, where the Y-type comb filter has pass-band peaks at frequencies equal to an integer multiple of the horizontal scanning frequency $f_h$ over which the brightness signal components are distributed and attenuation peaks at frequencies equal to an odd-number multiple of one half of the horizontal scan frequency $f_h$ over which the chrominance signal components are distributed, and the C-type comb filter has pass band peaks at frequencies equal to odd-number multiplies of one half of the horizontal scan frequency $f_h$ over which the chrominance signal components and attenuation peaks at frequencies equal to an integer multiple of the horizontal scanning frequency $f_h$ over which the brightness signal components are distributed. Thus, when comb filters constructed in the manner described above are used, it is possible to separate the brightness signal and the chrominance signal from each other, which have been combined together in the common band in the frequency interleaved relationship.

Figure 3:
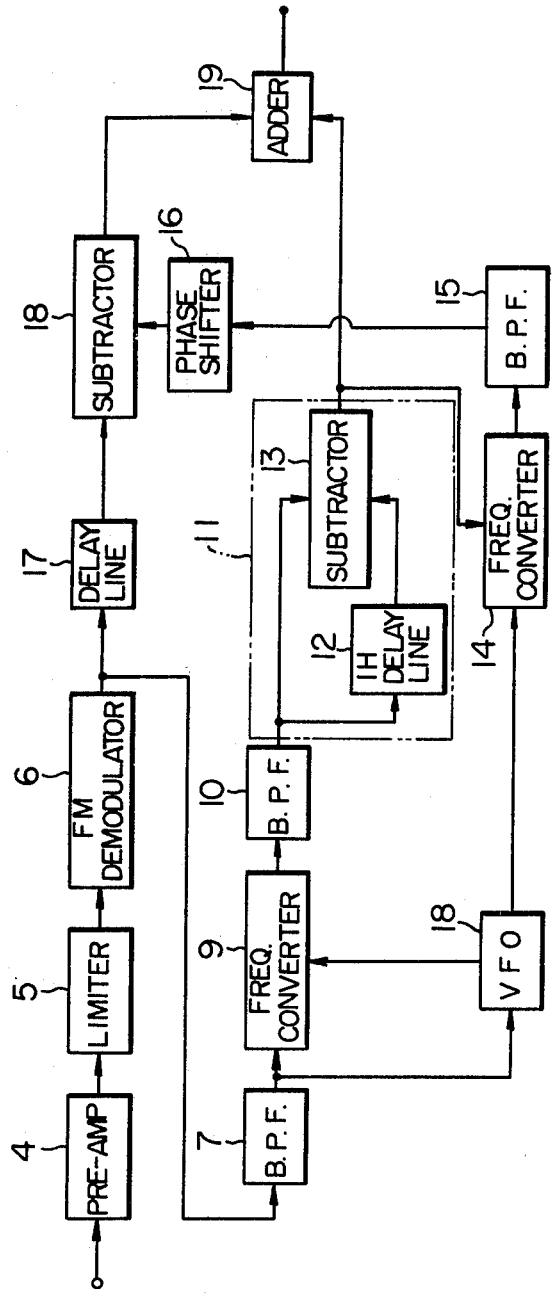
FIG. 3 shows a block diagram illustrating a signal processing system for a prior art buried subcarrier system.

FIG. 3 shows a block diagram of a signal processing circuit for a signal recorded and reproduced in the buried subcarrier system. A record medium for the signal may be a video disk on which a signal is recorded as a geometrical change on a surface of the disk, a video tape on which a signal is magnetically recorded on the magnetic tape, or any other medium.

It is desirable to record the video signal on the record medium in frequency modulated form. A signal read out of the record medium is amplified by a pre-amplifier 4, an output of which is amplitude limited by a limiter circuit 5 and demodulated by an FM demodulator 6. Numeral 7 denotes a band-pass filter having a pass band of 1.53 MHz±0.5 MHz and extracts a band of the chrominance signal having a center frequency at 1.53 MHz±Δf, where Δf represents a jitter component of the reproduced signal. The brightness signal components which have been combined with the chrominance signal in the frequency interleaved relationship are also included in this band. Numeral 8 denotes a variable frequency oscillator having a center frequency at 5.113636 MHz (hereinafter simply referred to as 5.11 MHz). It is designed in accordance with a known APC method (not shown) to have the same frequency variation as that of a color burst of the chrominance signal in the reproduced video signal, by a variable frequency oscillator oscillating at approximately 1.53 MHz having its phase locked to a burst in the input signal and a stable crystal oscillator oscillating at 3.58 MHz. Accordingly, the frequency of the variable frequency oscillator 8 is 5.11 MHz±Δf. Numeral 9 denotes a frequency converter circuit which produces a sum frequency and a difference frequency of 5.11 MHz±Δf and 1.53 MHz±Δf. Numeral 10 denotes a band-pass filter having a pass band of 3.58 MHz±0.5 MHz, and it extracts the difference component between 5.11 MHz±Δf and 1.53 MHz±Δf in the signal from the frequency converter 9. Accordingly, the frequency of the chrominance signal in the output of the band-pass filter 10 is equal to (5.11 MHz±Δf)−(1.53 MHz±Δf)=3.58 MHz which coincides with the frequency of the crystal oscillator and which is free from the jitter component and also coincides with the frequency of the chrominance subcarrier in the standard NTSC system television signal. Numeral 11 denotes a C-type comb filter which comprises a 1H delay line 12 and a subtracting circuit 13, and attenuates the brightness signal components which are distributed over the frequency band of 3.58 MHz±0.5 MHz and extracts only the chrominance signal components. Numeral 14 denotes a frequency converter circuit which produces a sum frequency and a difference frequency of the signal at 5.11 MHz±Δf from the variable frequency oscillator 8 and the chrominance signal at 3.58 MHz from the C-type comb filter 11. Numeral 15 denotes a band-pass filter having a pass band of 1.53 MHz±0.5 MHz, and it extracts the difference frequency component in the output of the frequency converter 14, that is, the chrominance signal component at (5.11 MHz±Δf)−3.58 MHz=1.53 MHz±Δf. Numeral 16 denotes a phase shifter which phase-shifts the chrominance signal having the center frequency of 1.53 MHz±Δf so that it is in phase with the chrominance signal having the center frequency of 1.53 MHz±Δf included in the signal of the buried subcarrier system from a delay line 17. Numeral 18 denotes a subtracting circuit which substantially constitutes a Y-type comb filter which attenuates the chrominance signal which has been combined with the brightness signal in the frequency interleaved relationship and extracts only the brightness signal. Numeral 19 denotes an adding circuit which adds the chrominance signal having the center frequency of 3.58 MHz which is derived from the C-type comb filter 11 and is free from a jitter component to the brightness signal from the Y-type comb filter which is substantially constituted by the subtracting circuit 18, to produce an NTSC system color video signal.

It has been known that when a signal is recorded and then reproduced, white and black dot noise appears around the reproduced signal. This occurs by a defect in the reproduced signal from the video disk or VTR and the causes thereof are those such as a crack on the surface of the disk, dust deposited thereon and peel-off of magnetic material of the magnetic tape.

Since such noise materially degrades the quality of the reproduced image, it is necessary to compensate the noise portion by another signal.

Figure 4A:
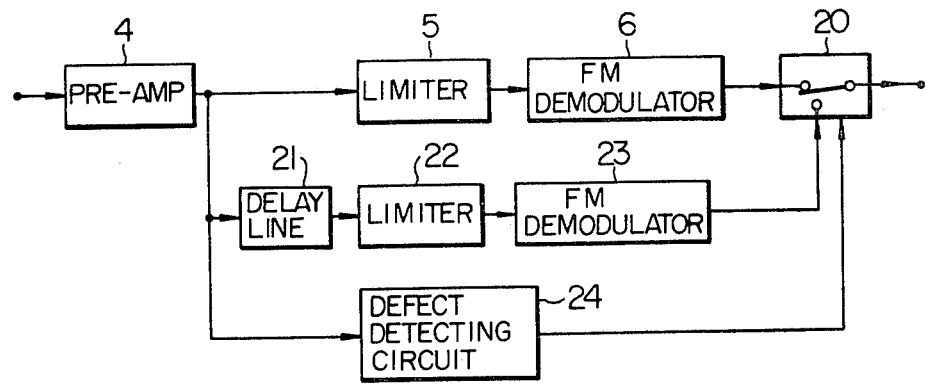
FIGS. 4A and 4B show block diagrams illustrating a defect signal compensation system.
Figure 4B:
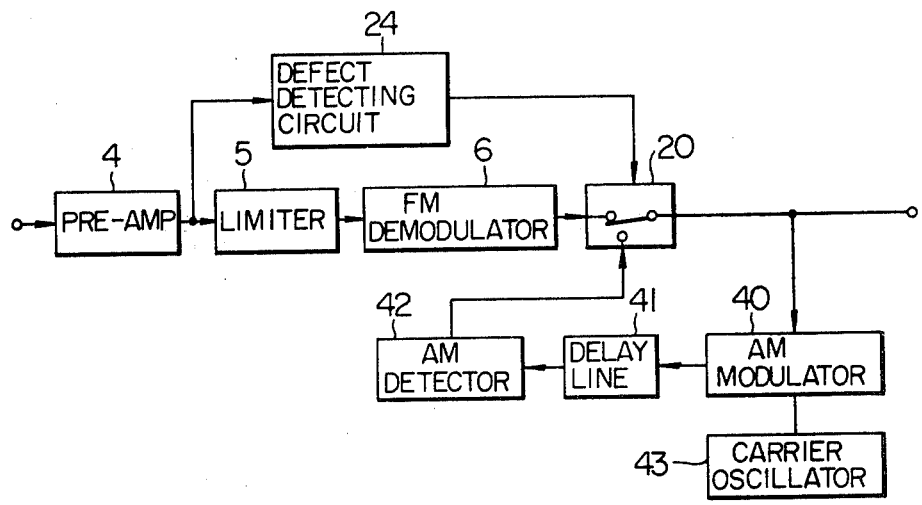

FIGS. 4A and 4B show prior art means for compensating for the defect in the reproduced signal. Like components to those shown in FIG. 3 are designated by like reference numerals. In FIG. 4A, the video signal of the buried subcarrier system which has been demodulated by the first FM demodulator 6 is normally passed through a switching circuit 20 to a circuit having Y-type and C-type comb filters as explained in FIG. 3 for converting the chrominance signal to the NTSC system chrominance signal. Numeral 21 denotes a delay line having a delay period equal to one horizontal scanning period (1H) or an integer multiple thereof, numeral 22 denotes a limiter, numeral 23 denotes a second FM demodulator which produces a demodulated signal delayed by an predetermined time period with respect to the signal from the first FM demodulator 6. Numeral 24 denotes a circuit for detecting a defect in the reproduced signal, and it produces an output to switch the switching circuit 20 when it detects a defect. In FIG. 4A, the defect detecting circuit 24 is designed to detect a variation in the amplitude of the reproduced FM signal, although any other circuit capable of detecting the defect in the reproduced signal may be used. When a defect in the reproduced signal is detected, the switching circuit 20 is switched to pass the output from the second FM demodulator 23 so that the defect portion in the reproduced signal is substituted by a signal portion which appeared n×1H periods earlier, where n is an integer, to compensate for the defect.

FIG. 4B shows another example of a prior art circuit for compensating for the defect. A signal from a record medium is applied to the pre-amplifier 4, the limiter 5 and the FM demodulator 6 where it is demodulated, and the demodulated output is normally passed through the switching circuit 20 to a succeeding circuit as in FIG. 4A. Numeral 40 denotes an AM modulator circuit, numeral 41 denotes a delay line having a delay time approximately equal to an integer multiple of 1H, numeral 42 denotes an AM detector circuit, and numeral 43 denotes a carrier oscillator. The output of the switching circuit 20 is delayed by a predetermined time period by the delay line 41. Numeral 24 denotes the defect detecting circuit which produces a signal to switch the switching circuit 20 during a defect period when it detects a defect in the reproduced signal. Accordingly, the defect portion is substituted by a signal portion appeared approximately n×1H period earlier, where n is an integer so that the defect is compensated for. The 1H delay line usually comprises a supersonic delay line. The supersonic delay line, however, produces many spurious components, 3H delayed spurious components, due to internal reflections. For example, a level of the spurious components may reach −22 dB. Therefore, the output of the 1H delay line includes a ripple in the frequency characteristic due to those spurious components, and since the 3H delayed spurious components dominate, the ripple has a period equal to ½ $f_h$. As a result, when the AM modulated signal is to be delayed by the supersonic delay line, a very stable carrier oscillator 43 is required, and a crystal oscillator is usually used as the carrier oscillator. Accordingly, the circuit of FIG. 4B requires an expensive crystal oscillator and hence it is more expensive than the circuit of FIG. 4A.

In the circuits of FIGS. 4A and 4B, it is necessary that the phase of the chrominance signal in the substituted portion must be continuous with that of the signal portion before substitution. Otherwise, the comb filter would not be constituted at the substituted portion so that the chrominance signal at 1.53 MHz would be included in the brightness signal at an enhanced level of approximately 6 dB and the chrominance signal would be lost. Accordingly, it is necessary to select the delay time of the delay line 21 or 41 to be longer or shorter than an odd-number multiple of 1H by one half cycle of 1.53 MHz, or to be equal to an even-number multiple of 1H. (The brightness signal is in phase with the brightness signal in the previous horizontal scanning period, but the phase of the chrominance signal is out of phase by one half cycle.) Furthermore, the delay line used must have a sufficiently wide band to pass not only a deviation range of the FM modulated signal or the carrier of the AM modulated wave but also the side bands for the chrominance signal at 1.53 MHz. Otherwise, the chrominance signal at 1.53 MHz could not be transmitted exactly and the comb filter would not operate properly and the substituted portion would appear unnaturally. However, when the delay line having the delay time which is longer or shorter than 1H period by one half cycle of 1.53 MHz is used, the phase of the chrominance signal can be matched but the delay time for the brightness signal includes an error equal to one half cycle of 1.53 MHz, that is, approximately 0.32μ second. As a result, discontinuity of the brightness signal appears in the image.

When a jitter is included in the reproduced signal, the phase of the chrominance signal changes irregularly so that the comb filter does not operate properly in the substituted portion. On the other hand, when the defect portion of the signal is substituted by a 2H delayed signal, the phase of the chrominance signal and the phase of the brightness signal are matched but two wide band 1H delay lines are required. This not only results in an expensive circuit but also corelation between the adjacent signal portions at the substituted portion is weakened because of a large amount of delay. Therefore, a viewer has an unnatural feeling when he views an abruptly changing scene. This is particularly remarkable in the brightness signal to which the viewer is sensitive. Furthermore, because of a large amount of delay, when the jitter is included in the reproduced signal, the chrominance signal includes a larger change in the phase than when the 1H delay line is used. Therefore, the operation of the comb filter is less complete.

Furthermore, in the circuit of FIG. 4A, a defect having a longer duration than the delay time of the delay line 21 cannot be compensated for.

The present invention is intended to overcome the above drawbacks encountered in the prior art systems and provides a novel and inexpensive defect compensation system.

It is, therefore, a primary object of the present invention to eliminate noise caused by a delay in switching at the start of compensating for a defect in a video signal to completely compensate the video signal, by separating a brightness signal and a chrominance signal from each other by a comb filter and substituting defect portions of the brightness signal and the chrominance signal with a signal portion having a duration equal to an integer multiple of one horizontal scanning period.

The video signal compensation system of the present invention is now explained with reference to the preferred embodiments thereof.

Figure 5:
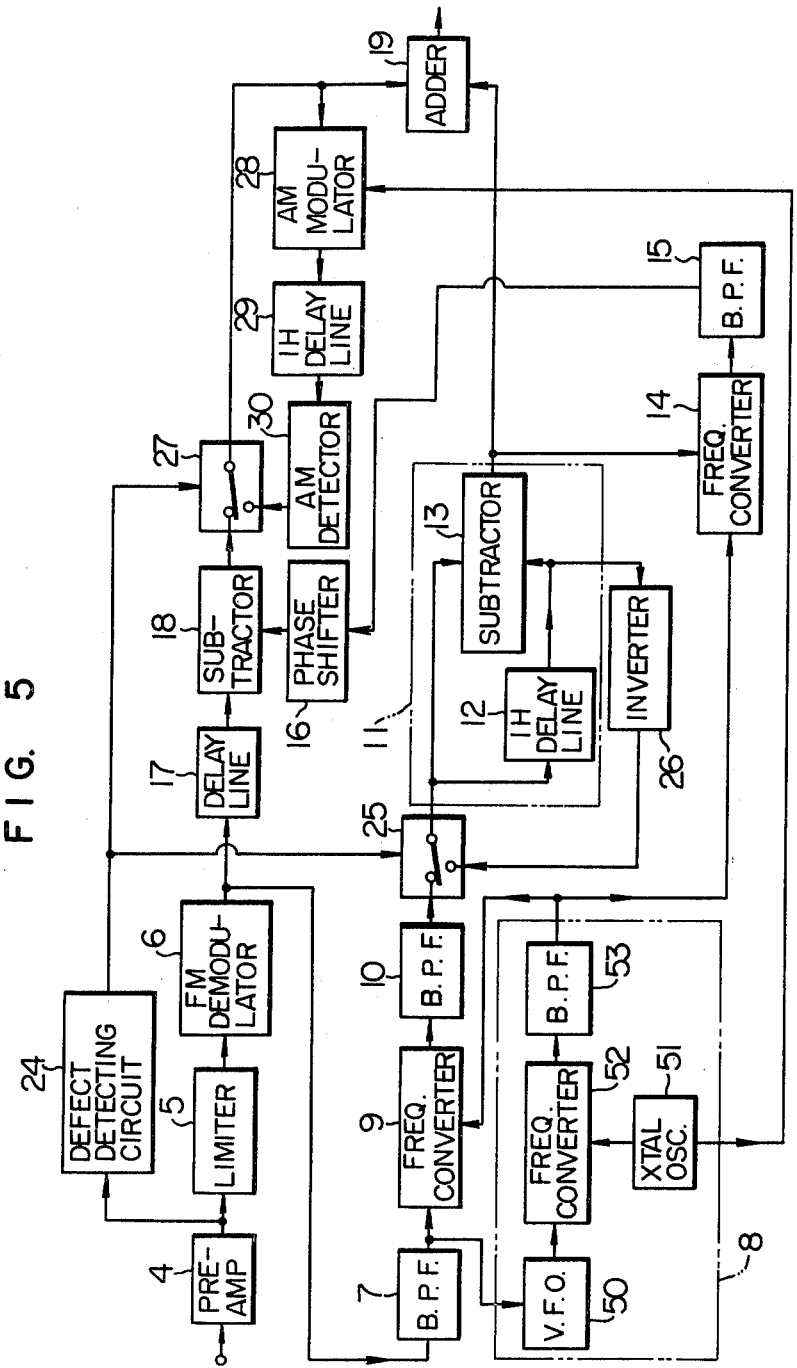
FIG. 5 shows a block diagram of one embodiment of the present invention.

FIG. 5 shows an embodiment of the present invention embodied in the system shown in the block diagram of FIG. 3. Like blocks to those shown in FIG. 3 are designated by like reference numerals. In FIG. 5, a signal read out of a record medium is applied to the preamplifier 4, the limiter 5 and the FM demodulator 6 where it is demodulated, and the demodulated signal is applied to the band-pass filter having a pass band of 1.53 MHz±0.5 MHz where a band including the chrominance signal and the brightness signal is separated. Numeral 8 denotes the variable frequency oscillator which has a center frequency at 5.11 MHz and includes the same jitter as that included in a burst signal in the input signal. An output of the variable frequency oscillator 8 is applied to the frequency converter 9 to frequency-convert the output signal from the band-pass filter 7.

An example of the construction of the variable frequency oscillator 8 is illustrated in FIG. 5, wherein numeral 50 denotes a phase-locked variable frequency oscillator, a phase of which is locked to the burst signal in the input signal and which has a center frequency at 1.53 MHz. Numeral 51 denotes a 3.58 MHz crystal oscillator having a very stable oscillation frequency. Numeral 52 denotes a frequency converter circuit which produces a sum frequency, 5.11 MHz, of 1.53 MHz and 3.58 MHz. Numeral 53 denotes a band-pass filter for extracting a continuous signal at 5.11 MHz.

The chrominance signal and the brightness signal having the band of 3.58 MHz±0.5 MHz included in the output of the frequency converter circuit 9 are separated by the band-pass filter 10 having the pass band of 3.58 MHz±0.5 MHz, and the output thereof is applied to the switching circuit 25, which is normally connected to pass the output of the band-pass filter 10 to the succeeding comb filter 11 which comprises the 1H delay line 12 and the subtracting circuit 13. The comb filter 11 constitutes a C-type comb filter and extracts the chrominance signal at 3.58 MHz±0.5 MHz. The output of the comb filter 11 is applied to the adding circuit 19 and also to the frequency converter circuit 14, which frequency converts the signal from the variable frequency oscillator 8 having the center frequency at 5.11 MHz to a chrominance signal having the frequency of 1.53 MHz±0.5 MHz, which signal is passed through the band-pass filter 15 and the phase shifter 16 to match the phase and level thereof to those of the chrominance signal of 1.53 MHz in the buried subcarrier signal which has passed through the delay line for matching the phase. Those signals are subtracted one from the other in the subtracting circuit 18, which substantially constitutes a Y-type comb filter. Numeral 27 denotes a switching circuit which is normally connected to pass the brightness signal in the output of the subtracting circuit 18 to the adding circuit 19. Therefore, the output of the adding circuit 19 represents a sum of the brightness signal and the chrominance signal at 3.58 MHz, which is an NTSC system color video signal. This signal is applied to a color television receiver to display a color image. Numeral 24 denotes the defect detecting circuit which detects a defect in the reproduced signal to produce a signal to switch the switching circuits 25 and 27. The operation of the circuit when the defect is detected is now explained. When the defect detecting circuit 24 detects the defect in the reproduced signal, a movable contact of the switching circuit 25 is switched to pass an output of an inverting amplifier 26 which inverts the output of the 1H delay line 12. When the switching circuit 25 is switched in this manner, the phase and the amplitude of the chrominance signal at the output of the comb filter 11 are kept continuous so that the chrominance signal in the defect area is compensated. Since a closed loop including the 1H delay line 12, the phase inverting amplifier 26 and the switching circuit 25 is constituted, the chrominance signal can be compensated even if the duration of the defect area is longer than 1H period. On the other hand, the compensation for the brightness signal is attained by the switching circuit 27, the AM modulator circuit 28, the 1H delay line 29 and the AM detector circuit 30. That is, the brightness signal which is substantially free from the chrominance signal by having been passed through the subtracting circuit 18 which substantially constitutes the Y-type comb filter, is normally passed through the switching circuit 27 to the adding circuit 19. When a defect is detected, a movable contact of the switching circuit 27 is switched to pass the output of the 1H delayed brightness signal, by the AM modulator circuit 28, the 1H delay line 29 and the AM detector circuit 30. In this manner, the defect area is compensated by supplying a substitute brightness signal. Since a closed loop including the switching circuit 27, the AM modulator circuit 28, the 1H delay line 29 and the AM detector circuit 30 is constituted, the brightness signal can be compensated even if the duration of the defect area is longer than a 1H period. It is of course desirable that the 1H delay line 29 can exactly transmit the entire band of the brightness signal, but practically it may have a narrower band. This is because the brightness signal, which is free from the chrominance signal at 1.53 MHz by having been passed through the Y-type comb filter, is delayed to compensate for the defect area, the substituted portion does not produce any obstacles or unnatural image even if the brightness signal is not exactly transmitted up to the frequency band over which the chrominance signal of 1.53 MHz distributes. Accordingly, in practice, no problems occur even if a delay line having a narrower band than that required for the 1H delay line used in FIG. 4 is employed. As a result, it is possible to use a 1H delay line having a center frequency equal to the chrominance subcarrier frequency of the NTSC system (approximately 3.58 MHz) which is readily available, and it is not necessary to use an expensive, wide band delay line. In this case, it is posible to commonly use the 3.58 MHz crystal oscillator 51 used in the variable frequency oscillator, as the carrier oscillator. As a result, no separate expensive crystal oscillator need be used for the 1H delay line, and the circuit can be constructed in a very inexpensive way. Furthermore, since the switching circuit 25 switches the signal which has been delayed by having been passed through the band-pass filters 7 and 10, and the switching circuit 27 switches the signal which has been delayed by having been passed through the delay line 17, the delay in timing for the detection of a defect due to the defect detecting circuit 24 can be fully compensated. Accordingly, the noise due to the delay of switching at the start of compensation for the defect, which has been a problem in the prior art compensation circuit, does not occur in the present circuit and a stable compensation is attained. Furthermore, since the compensating brightness signal is the 1H delayed signal the unnatural state of the brightness signal due to the weakness of vertical corelation, which occurs when the 2H delayed signal is used in FIG. 3, does not occur in the present circuit. Further, since the delay time of the brightness signal can be set precisely to a 1H period, the discontinuity of the brightness signal, which occurs when the signal delayed longer or shorter than 1H period by the time period corresponding to one half cycle of 1.53 MHz in FIG. 3, does not appear.

On the other hand, since the chrominance signal is compensated by the signal which is free from the frequency variation due to the jitter by having been passed through the frequency converter circuit 9, the disturbance of the chrominance signal due to the jitter and the inperfect operation of the comb filter, which occurred in FIG. 3, can be avoided.

Figure 6:
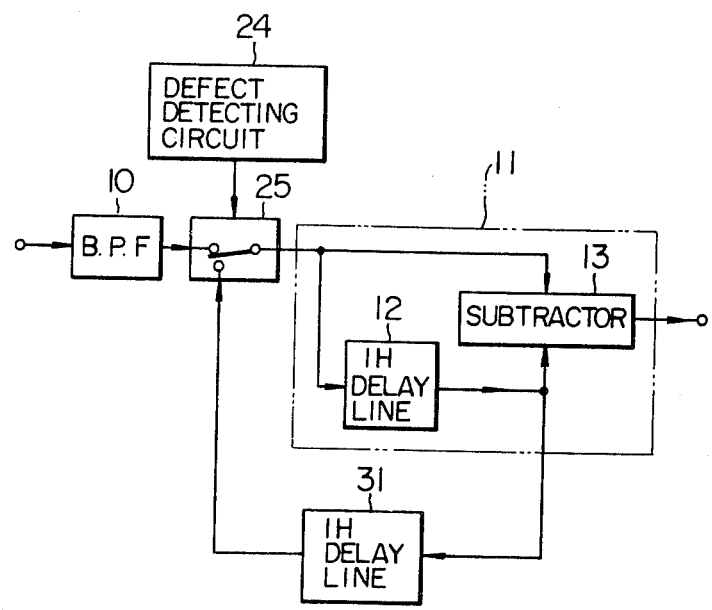
FIG. 6 shows a block diagram of a portion of another embodiment of the present invention.

FIG. 6 shows a block diagram of a portion of another embodiment of the present invention. It is an improvement over the embodiment shown in FIG. 5, and the like blocks to those of FIG. 5 are designated by the same reference numerals. The difference from FIG. 5 lies in that a 1H delay line 31 is inserted in place of the inverting amplifier in the closed loop for compensating the chrominance signal. Those portions which are not necessary for explaining the operation are omitted. In FIG. 6, the signal from the 1H delay line which constitutes the comb filter is applied to the subtracting circuit 13 which substantially constitutes the C-type comb filter, and is also applied to the other 1H delay line 31, an output of which is applied to the switching circuit 20 so that the output of the 1H delay line 31 is produced from the output of the switching circuit 25 when a defect is detected. In the circuit of FIG. 5, since both the chrominance signal and the brightness signal are inverted by the inverting circuit 26 in the defect area, a discontinuity of the brightness signal appears at the input to the comb filter and a perfect C-type comb filter is not constituted. As a result, a cross-color disturbance appears in the chrominance signal. In the circuit of FIG. 6, since the output of the 1H delay line forming the comb filter is further delayed by 1H period before it is applied to the input of the comb filter, there is a reversal of the chrominance signal between the output of the 1H delay line forming the comb filter and the input to the comb filter, but there is no reversal of the brightness signal between the output and the input. As a result, the C-type comb filter is constituted even in the defect area, and hence the cross-color disturbance does not appear and the defect area can be compensated by a stable chrominance signal.

What is claimed is:

1. A defect compensation system for a color video signal comprising:
    means for eliminating jitter in a frequency band including a chrominance signal component of a buried subcarrier color video signal in which a brightness signal and a chrominance signal are combined together in frequency interleaved relation;
    defect detecting means for detecting a defect of said color video signal;
    a first comb filter including a first delay line having a one-horizontal scanning period delay for extracting a chrominance signal component from the output of said jitter eliminating means;
    means for phase inverting a portion of the output signal of said first delay line so that the phase of at least the chrominance signal in the output signal may be maintained with the phase of the chrominance signal at the output of said jitter eliminating means;

first signal switching means actuated by a detection output signal from said defect detecting means, said first signal switching means being connected to normally apply the output of said jitter eliminating means to an input terminal of said first comb filter and to apply, during the defect period, the output of said phase adjusting means to the input terminal of said first comb filter;

a second comb filter means for subtracting the output signal of said first comb filter from said color video signal to extract only the brightness signal component;

second switching means actuated by the detection output signal from said defect detecting means, said second switching means being connected to normally apply the output of said second comb filter means to a first input terminal of an adder and to apply, during said defect period, a substitute signal comprising a delayed version of said second comb filter means output signal, to said first input terminal of said adder delayed by one horizontal scanning period through a second delay line; and means for applying the output of said first comb filter to a second input terminal of said adder, whereby said adder produces a standard color video signal.

2. A defect compensation system according to claim 1, wherein said means for phase inverting comprises a phase inverting amplifier.

3. A defect compensation system according to claim 1, wherein said means for phase inverting comprises a third delay line having a one-horizontal scanning period delay.

4. A defect compensation system according to claim 1, wherein the signal applied to said second delay line is derived by amplitude modulating the signal applied to said first terminal of said adder by a carrier derived from an output of a stable oscillator, and the output of said second delay line is applied to said second switching means after having been amplitude modulated.

5. A defect compensation system for a color video signal having a frequency interleaved luminance and chroma components comprising:

means for processing a color video signal including means for removing frequency jitter from the chroma components whereby a substantially jitter-free video signal is produced;

a defect detection means for providing a signal for indicating a defect in said color video signal;

a comb filter for removing the chroma components from a video signal;

means for providing a delayed and phase inverted signal from said substantially jitter-free signal;

switching means connected to said comb filter input and said means for providing a delayed and phase inverted signal; said switching means being operated by said defect detection means whereby when said video signal has a defect, said switching means supplies a delayed and inverted signal to said comb filter and in the absence of a defect supplies said jitter-free video signal to said comb filter;

means for subtracting a signal from said first comb filter from said color video signal whereby only luminance signal components are produced;

means for providing a substitute luminance signal from said luminance signal components;

an adder circuit for receiving an output signal from said comb filter; and a second switching means connected to said adder circuit, said means for subtracting and said means for providing a substitute luminance signal, said second switching means providing a substitute luminance signal to said adder when said defect detection means indicates a defect and providing said luminance signal to said adder when no defect is detected.

* * * * *